(12) United States Patent
Barbara (10) Patent No.: US 7,367,481 B2
(45) Date of Patent: May 6, 2008

(54) RAIL BAR ROOF RACK

(75) Inventor: Anthony Barbara, Smithfield (AU)

(73) Assignee: Roof Rack Industries Pty Ltd., New South Wales (AU)

( * ) Notice: Subject to any disclaimer, the term of this patent is extended or adjusted under 35 U.S.C. 154(b) by 525 days.

(21) Appl. No.: 10/769,455

(22) Filed: Jan. 30, 2004

(65) Prior Publication Data

US 2004/0211801 A1 Oct. 28, 2004

(30) Foreign Application Priority Data

Jan. 31, 2003 (AU) .............................. 2003900433
Aug. 7, 2003 (AU) .............................. 2003231688

(51) Int. Cl.
*B60R 9/00* (2006.01)
(52) U.S. Cl. ...................................... 224/319; 224/330
(58) Field of Classification Search ................ 224/315, 224/319, 323, 325, 326, 329–331
See application file for complete search history.

(56) References Cited

U.S. PATENT DOCUMENTS

| 5,275,320 | A | * | 1/1994 | Duemmler | 224/319 |
| 5,419,479 | A | * | 5/1995 | Evels et al. | 224/321 |
| 5,556,221 | A | | 9/1996 | Brunner | 403/322 |
| 6,626,340 | B1 | * | 9/2003 | Burgess | 224/323 |

FOREIGN PATENT DOCUMENTS

| EP | 0503305 A1 | | 9/1992 |
| EP | 0623490 A2 | | 11/1994 |
| EP | 852546 B1 | * | 4/1997 |
| EP | 1008490 A1 | | 6/2000 |
| JP | 11157394 A | * | 6/1999 |
| WO | WO9622901 | * | 8/1996 |
| WO | WO9624509 | * | 8/1996 |

* cited by examiner

*Primary Examiner*—Nathan Newhouse
*Assistant Examiner*—Margaret Olson
(74) *Attorney, Agent, or Firm*—Medlen & Carroll, LLP (57) ABSTRACT

A vehicle roof rack assembly (50) including a pair of clamp assemblies (11) that secure a roof rack bar (10) to the rails (12) of a vehicle having a roof over which the bar (10) is extend. Each clamp assembly (11) includes a pivotally mounted jaw member (26) that co-operates with a jaw (16) to engage the vehicle rail (12).

24 Claims, 9 Drawing Sheets

RAIL BAR ROOF RACK

This application claims priority to Australian Application No. 2003231688 filed Aug. 7, 2003, and to Australian Application No. 2003900433 filed Jan. 31, 2003.

TECHNICAL FIELD

The present invention relates to vehicle roof racks and more particularly to clamp assemblies that secure to a vehicle roof rail a bar that is to extend transversely across the vehicle.

BACKGROUND OF THE INVENTION

The number of new vehicles sold with factory fitted roof rails is increasing. These roof rails vary extensively with each vehicle. They range in profile, position and alignment on a vehicle. Known roof rack assemblies have a problem in that they are not always able to fit the variety of roof rails now available.

These variants also create a need for an adaptable roof rack product.

OBJECT OF THE INVENTION

It is the object of the present invention to overcome or substantially ameliorate the above problem.

SUMMARY OF THE INVENTION

There is disclosed herein a roof rack clamp assembly to secure to a vehicle roof rail a bar that is to extend transversely across a roof of the vehicle, said assembly including:

a first clamp part to engage the rail and bar;

a clamp device to also engage the rail and bar, said clamp device including a base to engage the bar so as to be secured thereto, and a second clamp part pivotally attached to the base for angular movement about an axis transverse of the bar; and a threaded shaft extending between the first and second clamp parts to cause relative movement therebetween including pivoting of said second pant about said axis, by rotation of the shaft about a longitudinal axis thereof with relative movement of the second part towards the first part clamping the roof rail therebetween to secure the clamp assembly and bar to the roof rail.

Preferably, said threaded shaft is movably mounted in said first clamp part and threadably engages said second clamp part.

Preferably, said second clamp part includes a jaw to engage the bar, and a jaw mounting bracket pivotally attached to the base for pivoting about said axis, with said jaw being pivotally attached to said mounting bracket for pivoting movement about a jaw axis parallel to said axis.

Preferably, said shaft is movably mounted in said first clamp part for angular movement about an axis generally traverse of the shaft.

Preferably, said shaft includes a first longitudinal portion threadably engaged with said mounting bracket, and a second longitudinal portion telescopically received within the first portion and which is gripped by a user to cause rotation of the shad about the longitudinal axis thereof.

Preferably, said telescopic portion includes a handle and said first clamp part includes a cavity to receive said handle.

Preferably, said handle includes a lock that is operable to selectively retain the handle within said cavity.

Preferably, said assembly further includes a lock member pivotally mounted in said first clamp part for pivoting movement about an axis generally normal to said shaft, is said lock member being positioned to be selectively engaged by said lock to retain the handle in said cavity.

There is further disclosed herein, in combination, said bar, with said first clamp past and base slidably mounted thereon to thereby enable positioning prior to engagement with the rail.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

In FIGS. 1 to 5 of the accompany drawings there is schematically depicted a portion of a vehicle roof rack assembly 50 that is to engage de longitudinally extending vehicle roof rails 12 so as to be secured to the vehicle. The assembly 50 includes a pair of clamp assemblies 11 and a roof rack bar 10 that is to extend transversely across the vehicle roof and which would typically support a load.

The bar 10 is attached to longitudinally extending roof rails 112 of the vehicle by means of the clamp assemblies 11. An assembly 11 is at each longitudinal end of the bar 10, however it should be appreciated that only one assembly 11 and roof rail 12 is illustrated.

Each clamp assembly 11 includes a first clamp part 13 having an upper projection 14 that is slidably received within a longitudinally extending slot 15 in a lower portion of the bar 10. The clamp part 13 further includes a jaw portion 16 having a concave surface 17 that engages the rail 12.

Each clamp assembly 11 further includes a clamp device 18 including a base 19 that is slidably received within a longitudinally extending passage 20 of the bar 10. The base 19 is configured to engage within the passage 20 so that it is oriented generally transverse of the passage 20. The base 19 is generally "U-shaped" so as to have a pair of spaced arms 21 between which a pivot pin 22 passes. The clamp device 18 farther includes a second clamp part 23 including a jaw mounting bracket 24. The bracket 24 is pivotally attached to the base 19 by means of the pin 22. Accordingly, the bracket 24 pivots about an axis generally transverse of the bar 10. This a would also be substantially parallel to the rail 12. Pivotally attached to the bracket 24 by means of a pin is a jaw member 26 having a concave so 27 that engages the rail 12. Accordingly, the rail 12 is clamped between the surfaces 17 and 27 so as to be securely engaged by the clamp assembly 11. The pin 25 is generally parallel to the pin 22. Accordingly the jaw member 26 pivots about an axis generally parallel to the rail 12 and transverse of the bar 10.

Extending between the first lamp part 13 and second clamp part 23 is a threaded shaft 28. The shaft 28 has a first longitudinal length 29 that is threaded and engages a threaded passage 30 in a nut 31. The nut 31 is generally cylindrical in configuration and is slidably mounted in apertures 32 in the mounting bracket 24. Accordingly, the nut 31 can pivot about an axis generally parallel to the pins 22 and 25. The threaded shaft 28 includes a second longitudinal length 33 that is telescopically received within the length 29 and acts as a drive shaft to be manipulated by the user. Attached to the outer extremity of the length 33 is a handle 34 that is gripped by the user to cause rotation of the shaft 28. The handle 34 receives a lock cylinder 35 that is key operable to retain the handle 34 within a socket 36 of the first clamp part 13. More particularly, the cylinder 35 is configured so as to be retained within the cylinder passage 37. The cylinder 35 has an end flange 38 that is moved angularly by key operation between a first position engaging the first clamp part 13 (thereby retaining the handle 34 in the socket 36) and a second position permitting the handle 34 to be moved from within the socket 36. When the handle 34 is moved outwardly of the socket 36 the second length 33 moves with it as it is secured to the handle 34 by means of a pin 39 passing through a passage 40 in the length 33 and a passage 41 in the handle 34. In this respect it should be appreciated that the length 33, although telescopically located within the first length 29, is captively located with respect thereto by means of a projection 42. The first length 29 is captively located with respect to the first clamp part 13 by means of a clip 43 received within an annular recess 44 of the first length 29.

The shaft 28 passes through a passage 45 in the first clamp part 13 firstly to permit rotation of the daft 28 about its longitudinal axis as well as angular inclination of the shaft 28 relative to the first clamp past 13 and therefore bar 10. More particularly, the shaft 29 is permitted to move about an axis generally transverse of the first clamp part 13 and bar 10, that is an a generally parallel to the pins 22 and 25 so that the inclination of the shaft 28 has a range of approximately 20°.

In operation of the above described clamp assembly 11 a user by operation of a key withdraws the handle 34 from within the socket 36 and manipulates the handle 34 to cause rotation of the shaft 28, more particularly the first length 29. Rotation in a first angular direction will move the clamp device 18 towards the first clamp part 13. The surface 27 will approach the surface 17 until the rail 12 is clamped therebetween. This clamping Con will also force the base 19 into securing engagement within the internal surfaces of the passage 20 thereby Staining the clamp assembly 11 stationary with respect to the bar 10. If the shaft 28 is rotated in the opposite rotational direction the clamp device 18 moves away from the first clamp part 13 to release the rail 12.

Figure 1:
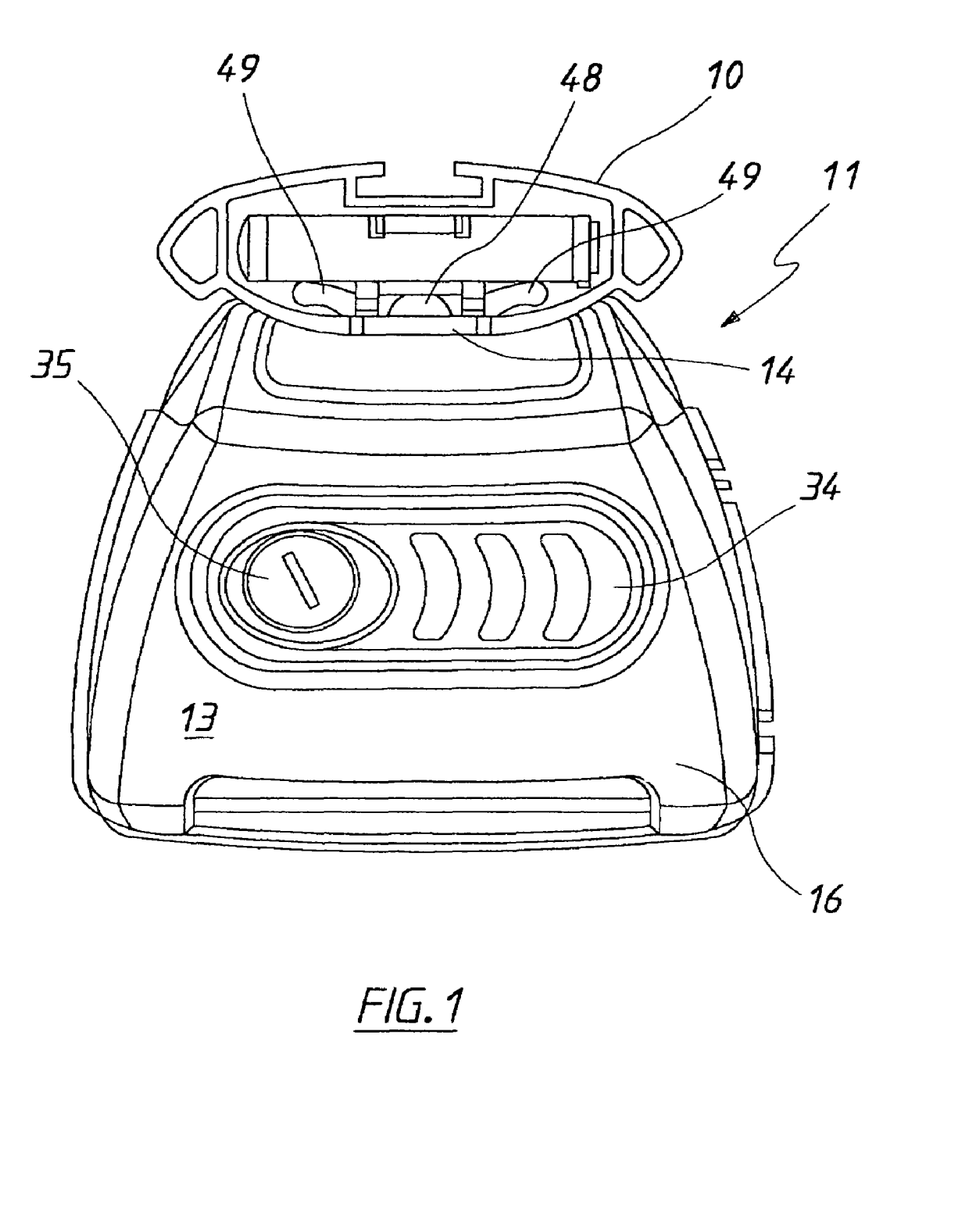
FIG. 1 is a schematic and elevation of a bar to extend transversely across a vehicle roof and a clamp assembly to secure the bat to a vehicle roof rail.
Figure 2:
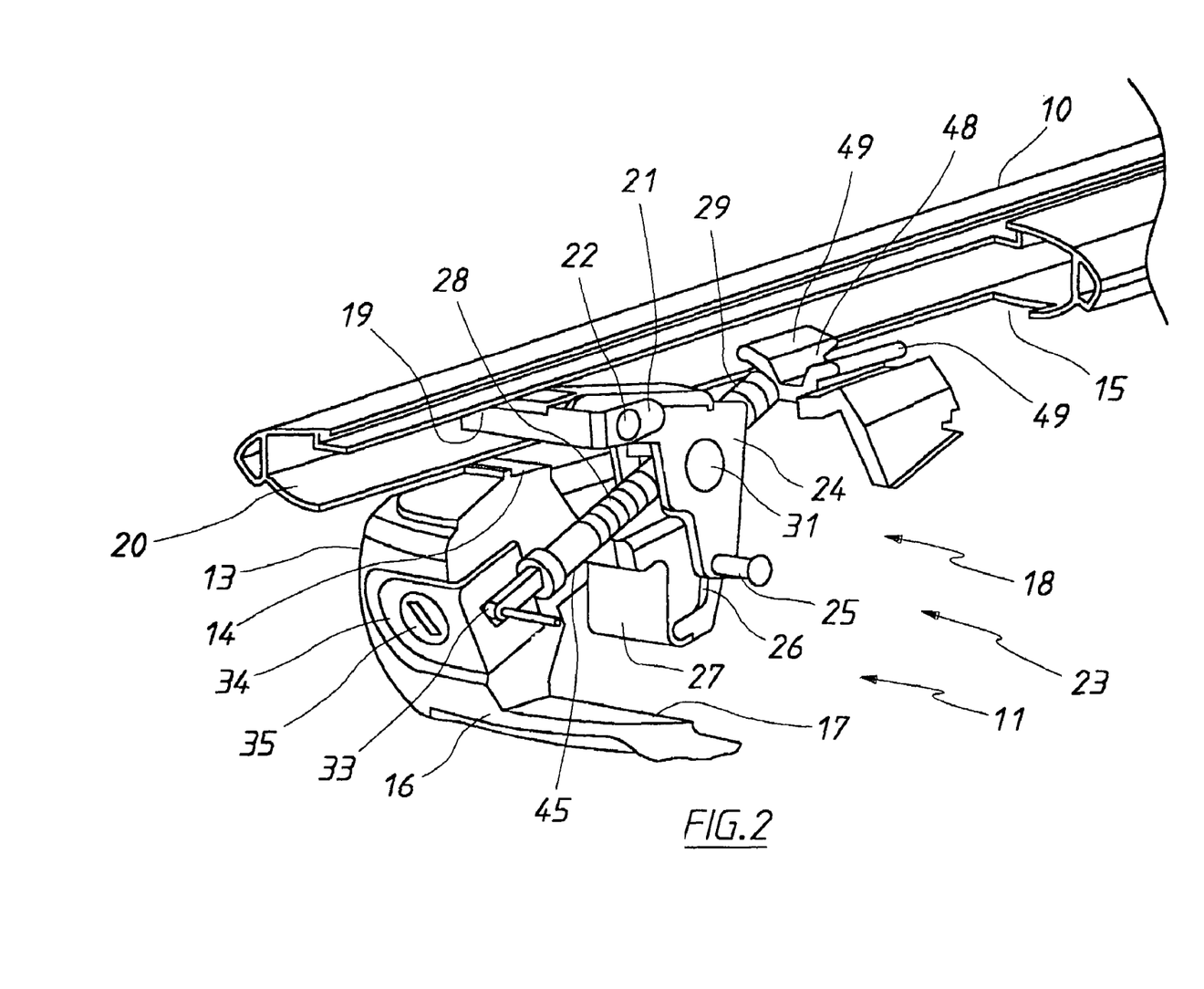
FIG. 2 is a schematic part sectioned isometric view of the bar and clamp assembly of FIG. 1.
Figure 3:
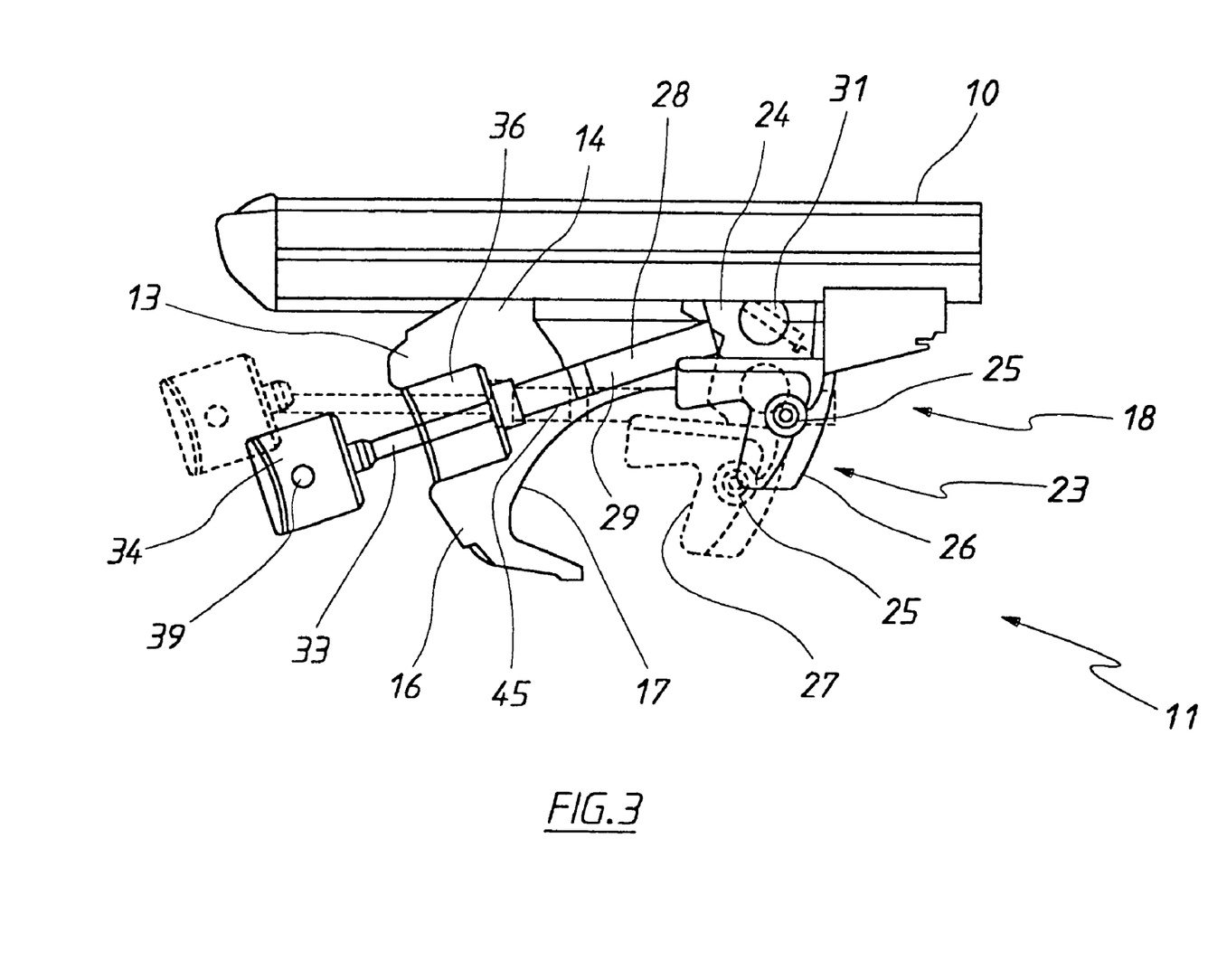
FIG. 3 is a schematic side elevation of the bar and clamp assembly of FIGS. 1 and 2.
Figure 4:
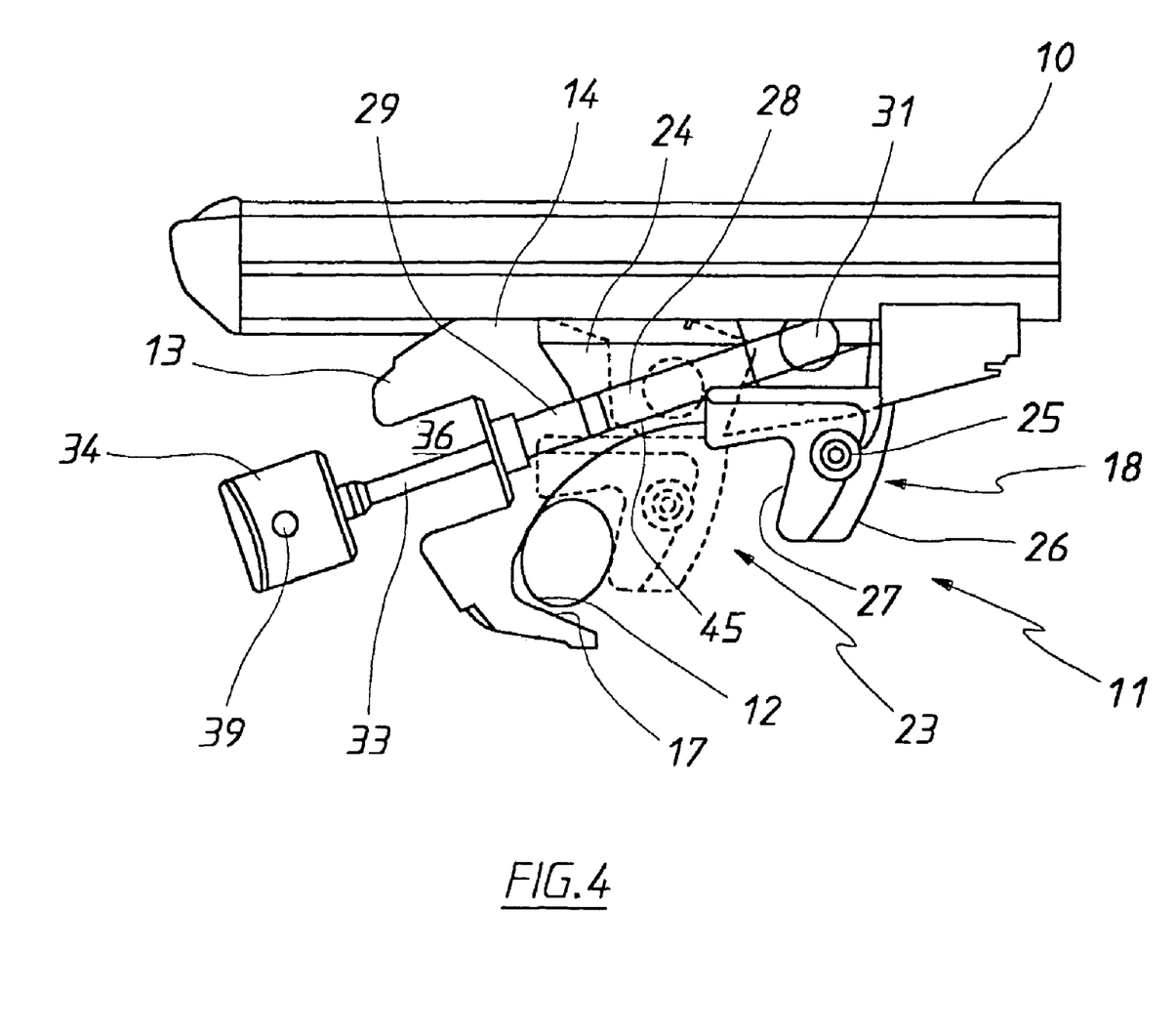
FIG. 4 is a further schematic side elevation of the bar and clamp assembly of FIGS. 1 and 2.
Figure 5:
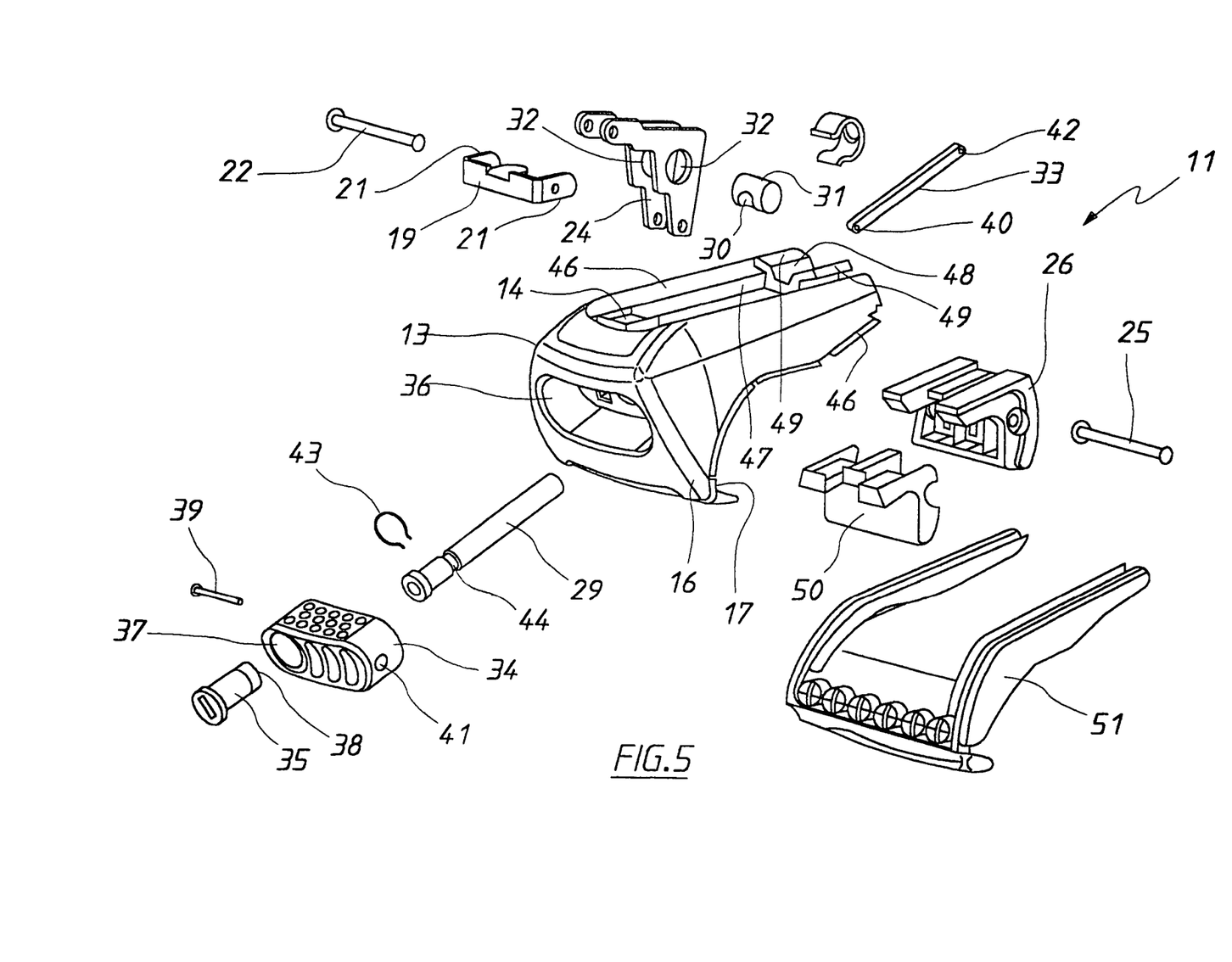
FIG. 5 is a schematic parts exploded isometric view of the clamp assembly of FIG. 1.
Figure 6:
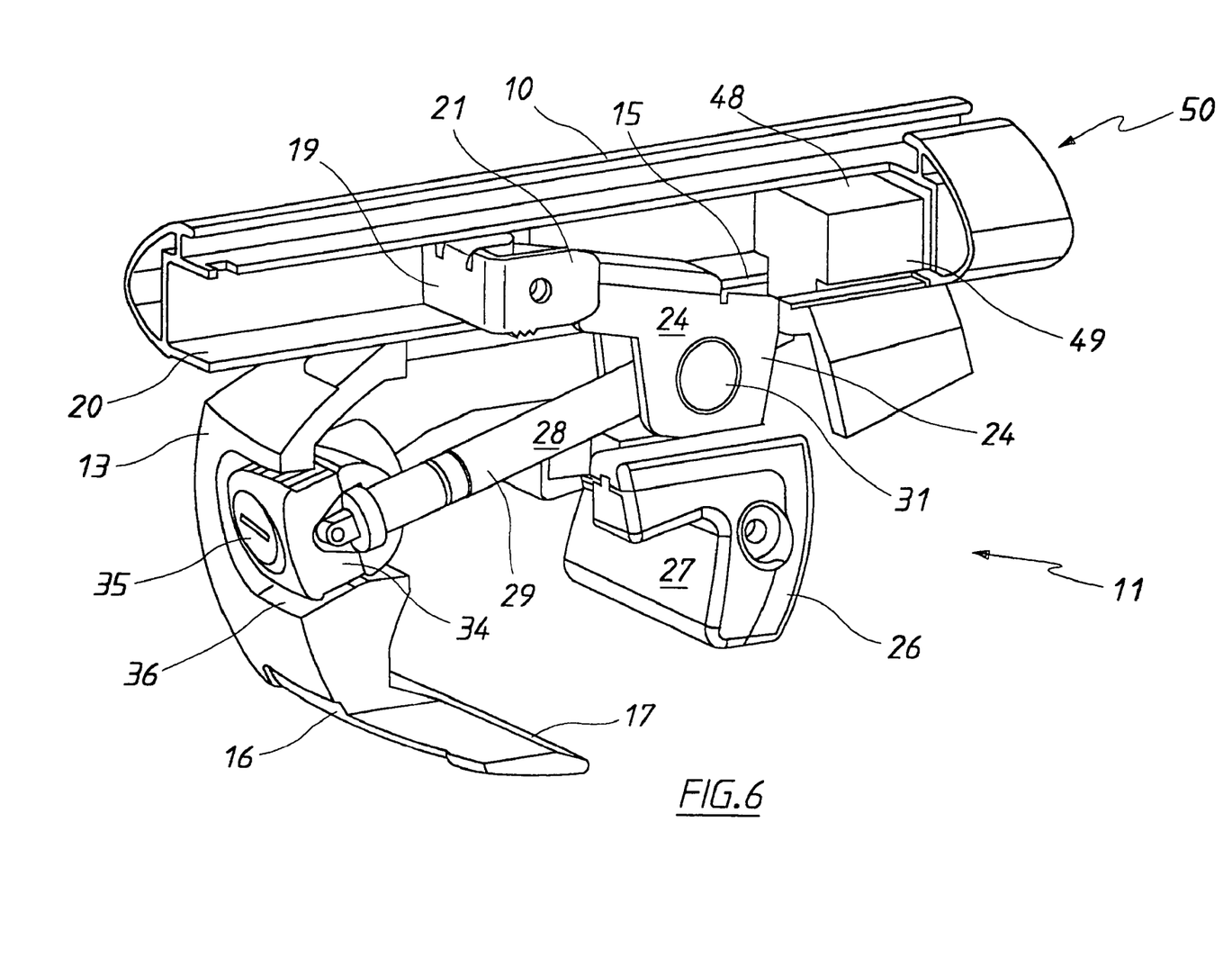
FIG. 6 is a schematic isometric view of a modification of the bar and clamp assembly of FIGS. 1 to 5.
Figure 7:
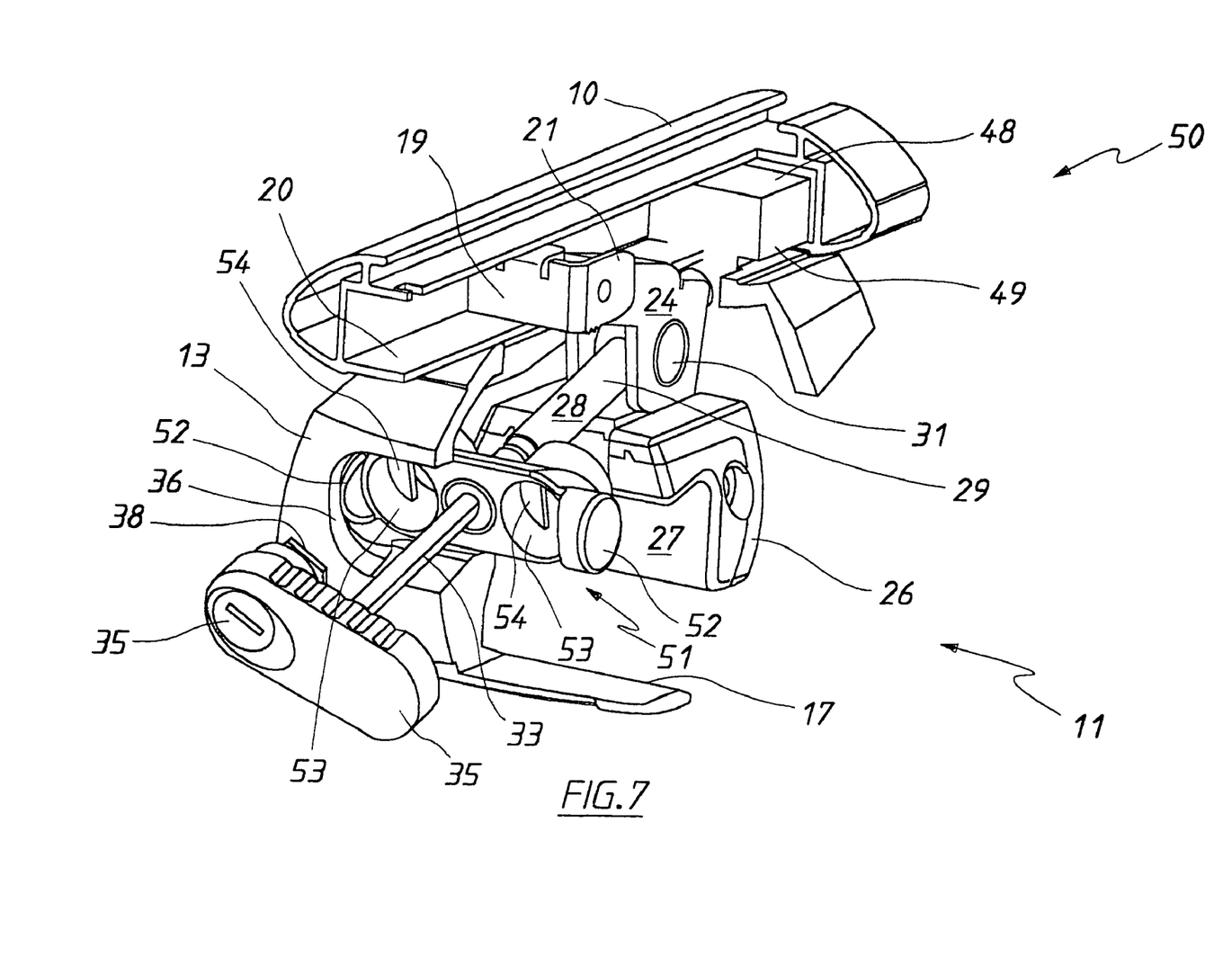
FIG. 7 is a schematic isometric view of the bar and clamp assembly of FIG. 6.
Figure 8:
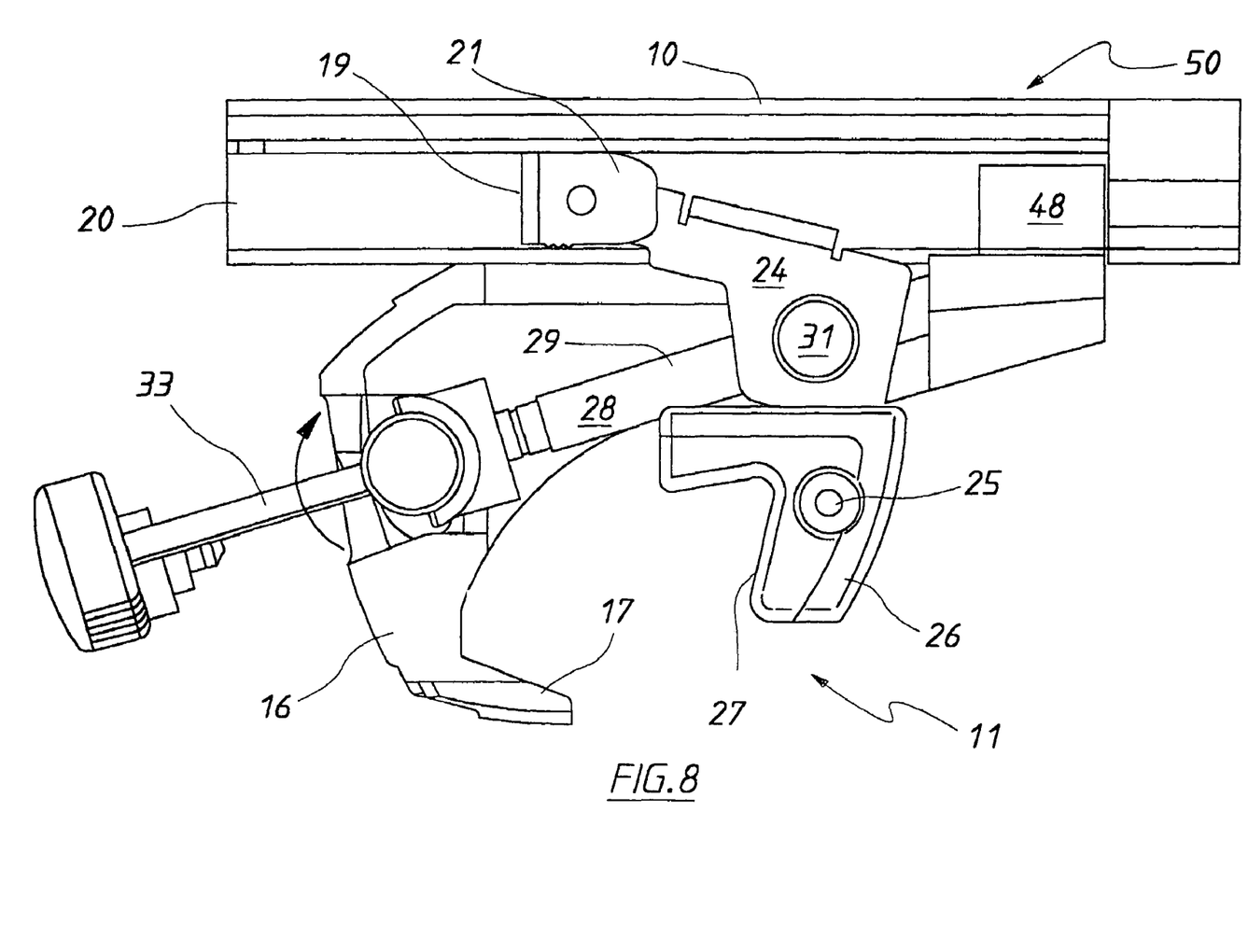
FIG. 8 is a schematic side elevation of the bar and clamp assembly of FIGS. 6 and 7.
Figure 9:
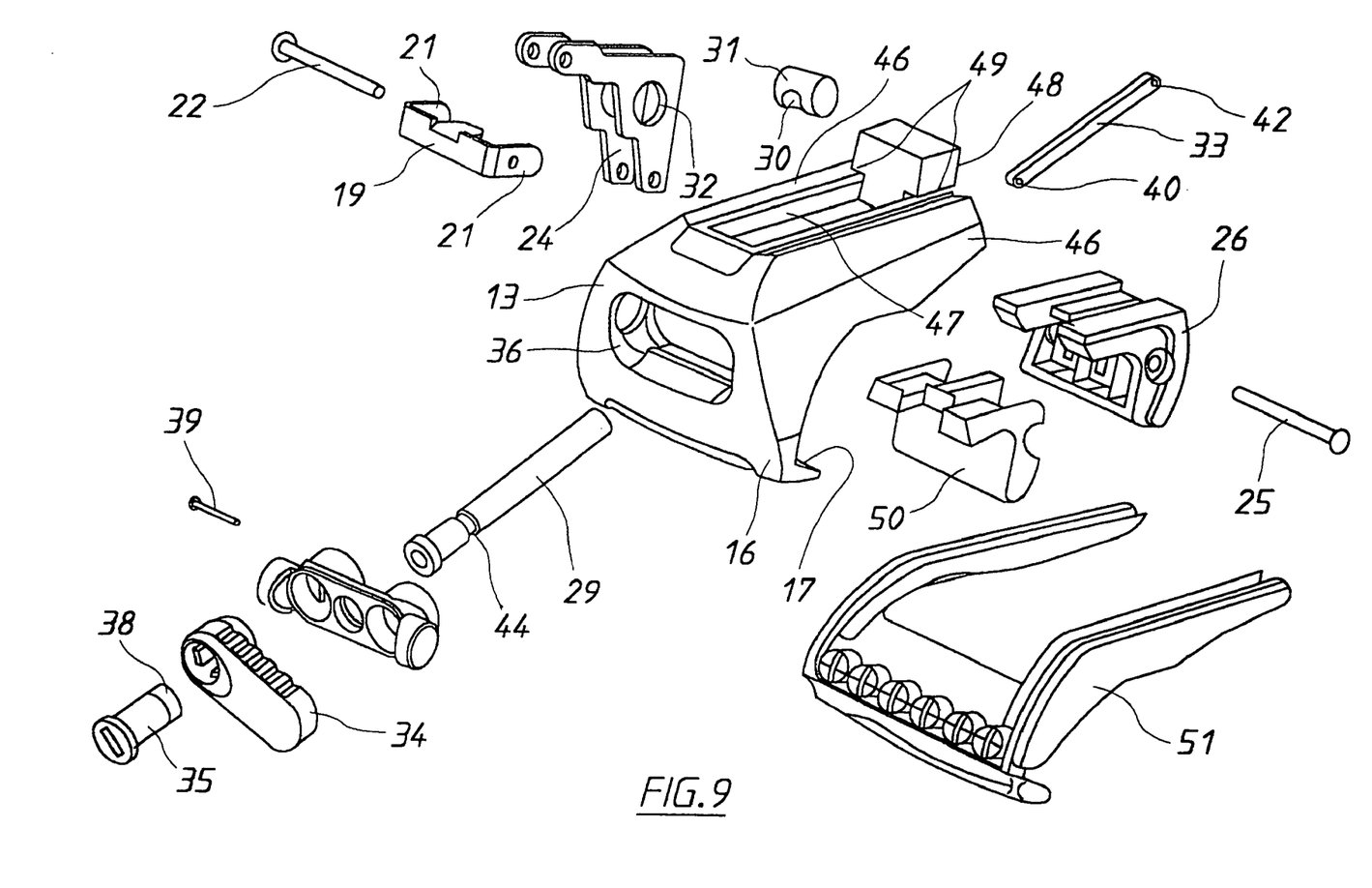
FIG. 9 is a schematic parts exploded isometric view of the clamp assembly of FIGS. 6 and 7

The first clamp part 13 includes spaced side walls 46 between which there is located a slot 47. The bracket 46 passes through the slot 47 to be secured to the base 19. Extending between the extremities of the walls 46 is a transverse member 48 having flanges 49 that are engaged within the bar 10 as best seen in FIG. 2.

To inhibit damage to the vehicle (including the rail 12) there is provided a resilient gasket 50 for the jaw member 26 and a resilient gasket 51 for the first clamp part 13.

Prior to clamping engagement with the rail 12 the first clamp part 13 and clamp device 18 are slidable along the bar 10 for positioning relative to the rail 12.

In FIGS. 6 to 9 of the accompanying drawings there is schematically depicted a modification of the roof rack assembly 50 of FIGS. 1 to 5. In FIGS. 6 to 9 the same reference numerals have been used as the reference numerals used in describing the embodiment of FIGS. 1 to 5.

In the embodiment of FIGS. 6 to 9 the configuration of the handle 34 has been altered and a locking member 51 added. The lock member 51 includes cylindrical end portions 52 that are slidably received within the first clamp 33 so that the member 52 is pivotable about an generally normal to the shaft 29. The member 52 has apertures 53 within which the cylinder 35 is to project together with the end flange 38 thereof. The member 51 further has flanges 54 that engaged by the flange 38 to secure the handle in the socket 36. More particularly, the handle 35 can be located in the socket 36 in either of two generally horizontal oriented positions depending on which of the flanges 54 is to be engaged by the flange 38.

The member 51 is included to provide for angular displacement of the shaft 29 relative to the first clamp part 13 due to movement of the bracket 24.

The above described preferred embodiments have a number of advantages including being able to accommodate a larger variety of rail configurations and being able to securely retain the handle 34 in a position inhibiting unauthorised operation.

The claims defining the invention are as follows:

1. A roof rack clamp assembly to secure a vehicle roof rail to a bar that is to extend transversely across a roof of the vehicle, said assembly including:
   a first clamp part to engage the rail and bar;
   a clamp device to also engage the rail and bar, said clamp device including a base to engage the bar so as to be secured thereto, and a second clamp part pivotally attached to the base for angular movement about a pivot axis transverse of the bar; and
   a threaded shaft extending between the first and second clamp parts to cause relative movement therebetween, including pivoting of said second part about said axis, by rotation of the threaded shaft about a longitudinal axis thereof, with relative movement of the second part towards the first part clamping the roof rail therebetween to secure the clamp assembly and bar to the roof rail; and wherein
   said second clamp part includes a jaw to be moved into clamping engagement with the bar by the angular movement of the second clamp part, and said second clamp part includes a jaw mounting bracket pivotally attached to the base for pivoting about said pivot axis, with said jaw being pivotally attached to said mounting bracket for pivoting movement about a jaw axis parallel to said pivot axis.

2. The assembly of claim 1 wherein, said threaded shaft is movably mounted in said first clamp part for angular movement about an axis generally transverse of the threaded shaft.

3. In combination, the assembly of claim 1 and said bar, with said first clamp part and base slidably mounted on said bar to thereby enable positioning prior to engagement with the rail.

4. The assembly of claim 3 wherein, said threaded shaft includes a first longitudinal portion threadably engaged with said mounting bracket, and a second longitudinal portion telescopically received within the first portion and which is gripped by a user to cause rotation of the threaded shaft about the longitudinal axis thereof.

5. The assembly of claim 4, wherein said second portion includes a handle and said first clamp part includes a cavity to receive said handle.

6. The assembly of claim 5 wherein, said handle includes a lock that is operable to selectively retain the handle within said cavity.

7. The assembly of claim 6 further including a lock member pivotally mounted in said first clamp part for pivoting movement about an axis generally normal to said threaded shaft, said lock member being positioned to be selectively engaged by said lock to retain the handle in said cavity.

8. The assembly of claim 1 wherein, said threaded shaft is movably mounted in said first clamp part and threadably engages said second clamp part.

9. The assembly of claim 8 wherein, said threaded shaft is movably mounted in said first clamp part for angular movement about an axis generally transverse of the threaded shaft.

10. The assembly of claim 9 wherein, said threaded shaft includes a first longitudinal portion threadably engaged with said mounting bracket, and a second longitudinal portion telescopically received within the first portion and which is gripped by a user to cause rotation of the threaded shaft about the longitudinal axis thereof.

11. The assembly of claim 10 wherein, said second portion includes a handle and said first clamp part includes a cavity to receive said handle.

12. The assembly of claim 11 wherein, said handle includes a lock that is operable to selectively retain the handle within said cavity.

13. The assembly of claim 12 further including a lock member pivotally mounted in said first clamp part for pivoting movement about an axis generally normal to said threaded shaft, said lock member being positioned to be selectively engaged by said lock to retain the handle in said cavity.

14. In combination, the assembly of claim 13 and said bar, with said first clamp part and base slidably mounted on said bar to thereby enable positioning prior to engagement with the rail.

15. A roof rack clamp assembly to secure to a vehicle roof rail a bar that is to extend transversely across a roof of the vehicle, said assembly including:
   a first clamp part to engage the rail and bar;
   a clamp device to also engage the rail and bar, said clamp device including a base to engage the bar so as to be secured thereto, and a second clamp part pivotally attached to the base for angular movement about a pivot axis transverse of the bar; and
   a threaded shaft extending between the first and second clamp parts to cause relative movement therebetween, including pivoting of said second part about said pivot axis, by rotation of the shaft about a longitudinal axis thereof, with relative movement of the second part towards the first part clamping the roof rail therebetween to secure the clamp assembly and bar to the roof rail; and wherein
   said second clamp part includes a jaw mounting bracket attached to the base, and a jaw to be moved into clamping engagement with the bar by the angular movement of the second clamp part, and
   said threaded shaft includes a first longitudinal portion threadably engaged with the mounting bracket, and a second longitudinal portion telescopically received within the first portion and which is gripped by a user to cause rotation of the threaded shaft about the longitudinal axis thereof.

16. The assembly of claim 15 wherein, said threaded shaft is movably mounted in said first clamp part and threadably engages said second clamp part.

17. The assembly of claim 15 wherein, said threaded shaft is movably mounted in said first clamp part for angular movement about an axis generally transverse of the threaded shaft.

18. In combination, the assembly of claim 15, wherein said bar, with said first clamp part and base slidably mounted on said bar to thereby enable positioning prior to engagement with the rail.

19. The assembly of claim 15, wherein said second clamp part includes a jaw mounting bracket pivotally attached to the base for pivoting about said pivot axis, with said jaw being pivotally attached to said mounting bracket for pivoting movement about a jaw axis parallel to said pivot axis.

20. The assembly of claim 19, wherein said threaded shaft is movably mounted in said first clamp part for angular movement about an axis generally transverse of the threaded shaft.

21. The assembly of claim 15, wherein said second portion includes a handle and said first clamp part includes a cavity to receive said handle.

22. The assembly of claim 21, wherein said handle includes a lock that is operable to selectively retain the handle within said cavity.

23. The assembly of claim 22 further including a lock member pivotally mounted in said first clamp part for pivoting movement about an axis generally normal to said threaded shaft, said lock member being positioned to be selectively engaged by said lock to retain the handle in said cavity.

24. In combination, the assembly of claim 23 and said bar, with said first clamp part and base slidably mounted on said bar to thereby enable positioning prior to engagement with the rail.

* * * * *